United States Patent

[11] 3,612,843

[72] Inventor Bernard Aptroot-Soloway
London, England
[21] Appl. No. 847,320
[22] Filed Aug. 4, 1969
[45] Patented Oct. 12, 1971
[73] Assignee Soval Limited
London, England
[32] Priority Aug. 6, 1968, Oct. 2, 1968
[33] Great Britain
[31] 37,356/68 and 46,858/68

[54] CHECKING THE FEED-IN OF DATA TO DATA-PROCESSING APPARATUS
20 Claims, 10 Drawing Figs.

[52] U.S. Cl. ........................................................ 235/153, 340/380, 340/146.1, 356/163
[51] Int. Cl. ........................................................ G06k 5/02, G06f 11/04
[50] Field of Search ............................................ 350/96; 356/163, 256; 340/146.1, 380; 235/153; 355/1

[56] References Cited

UNITED STATES PATENTS

| | | | |
|---|---|---|---|
| 3,283,651 | 11/1966 | King et al. | 355/1 |
| 2,640,872 | 6/1953 | Hartley et al. | 340/146.1 UX |
| 3,235,716 | 2/1966 | Porter et al. | 235/153 |

*Primary Examiner*—Malcolm A. Morrison
*Assistant Examiner*—R. Stephen Dildine, Jr.
*Attorney*—Pennie, Edmonds, Morton, Taylor and Adams

ABSTRACT: For transferring a sequence of data characters from a source document into a data-processing system, an operator is caused in one operation to read and feed-in the characters in a first predetermined order, for example as they appear on the document. In another operation the operator is caused to read and feed-in the same characters rearranged in a second predetermined order. Logical circuitry rearranges the characters fed-in in one of these operations, so as to formulate electronically a sequence which should be identical with the sequence fed-in in the other of these operations, and compares these last two sequences with one another. If these last two sequences are identical, the data characters can be read out electronically from the circuitry in their original order.

CHECKING THE FEED-IN OF DATA TO DATA-PROCESSING APPARATUS

Figure 1:
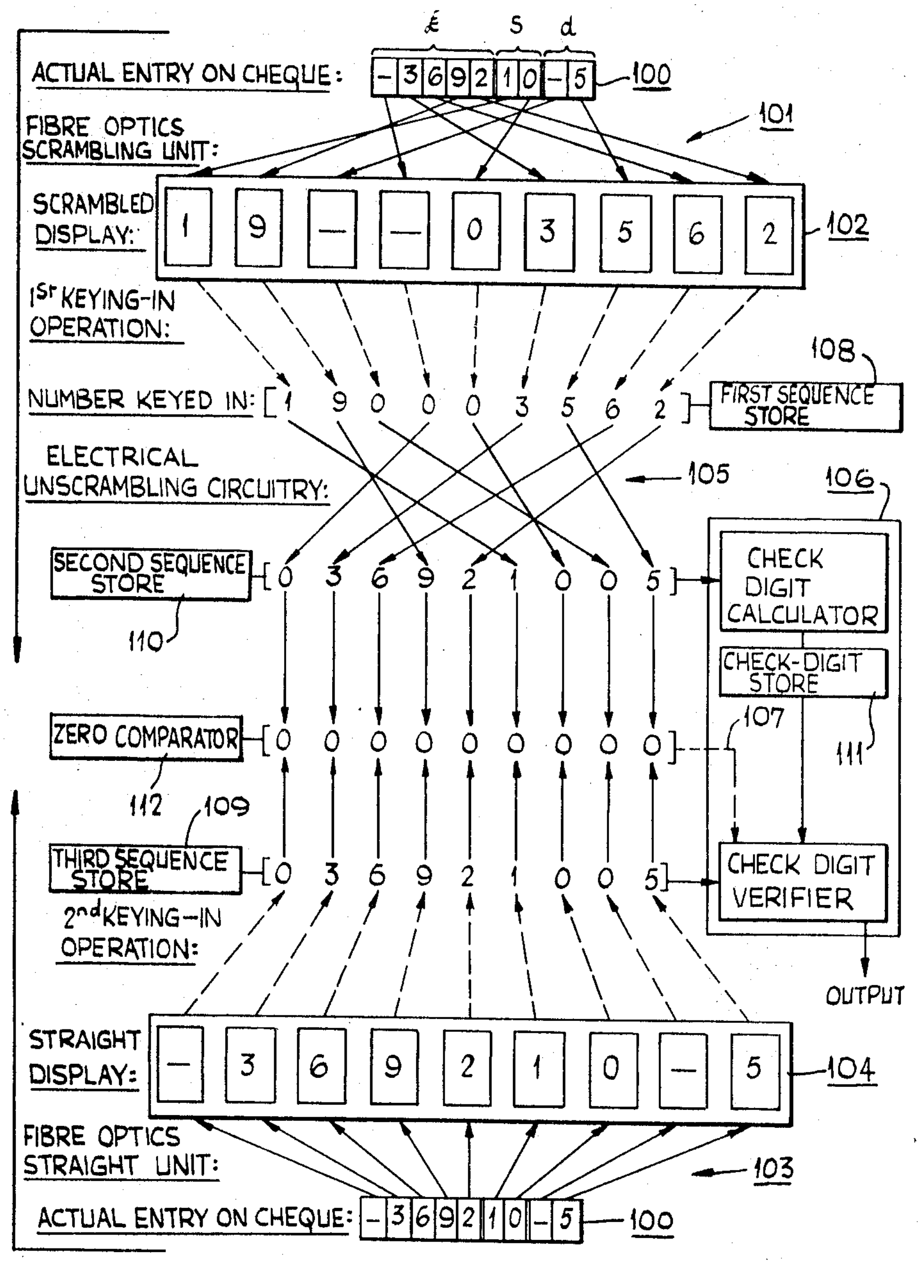

This invention relates to checking, or "securing," the feed-in of data to data processing apparatus.

Consider, for example, the data visible on a check presented to a bank, and the feed-in of that data to data processing apparatus employed by the bank in its accounting procedures. Numerical data from the check is normally fed into the apparatus by an operator who reads the data from the check itself and operates a tape punch, for example, by means of an office machine keyboard, so as to provide a recorded representation of the data in a form with which the data processing apparatus can cope.

One such item of numerical data visible on the check may be the account number of the customer who made out the check. This account number is of course predetermined, and should be the same on all checks drawn by that customer. The account number may include a check-digit printed on the check along with the rest of the account number; if so, the account number is said to have been "secured" by the inclusion of the check-digit. The predetermined sequence of numbers that constitutes such a secured item of data visible on the check can be keyed into the data processing apparatus, by way of the aforementioned office machine, by a single operator. A check-digit verifier included in the data processing apparatus will automatically check that the check-digit part of the account number as keyed-in is compatible with the rest of the account number as keyed-in. Thus the number keyed-in will not be passed on to the subsequent processing apparatus unless the operator has read and keyed-in the account number correctly.

However, in addition to such a predetermined and presecured item of information, the check bears the arbitrary (or "random") sequence of numbers that constitutes the amount of money for which the check has been drawn. Clearly this arbitrary sequence of numbers does not include a check-digit for ensuring that the sequence is correctly entered into the data processing apparatus. In reading such an arbitrary sequence of numbers from the check, and keying it into the data processing apparatus, operator mistakes can and do occur. One way of providing a check on the feed-in of such an arbitrary sequence would be to have the same operator read and key-in the sequence a second time, and to employ a check-digit calculator/verifier to check whether the numbers keyed-in form the same sequence in each instance. However, even if a deliberate time delay is introduced between the first and second keying-in operations, there is in many cases a definite tendency for an operator to repeat an error made previously. A more satisfactory, but more cumbersome and time-consuming checking method involves passing the check to a second operator, who reads and keys-in the same item of arbitrary information as the first operator, a check-digit calculator/verifier being again employed to compare the respective sequences of numbers fed in by the two operators.

It is an object of the present invention to provide means whereby a single operator can, without having to leave any substantial delay between two separate keying-in operations, provide a worthwhile check on his own feeding-in, to a data processing apparatus, of an item of information presented to him as an arbitrary sequence of visible characters.

To achieve this object the operator may be caused to carry out two feeding-in operations which are basically independent of one another, without any substantial time lapse between the two operations. In one feeding-in operation the operator reads and keys-in to a checking device the sequence of characters just as they appear on the actual document bearing those characters. In the other feeding-in operation the operator is caused to read and key-in the characters concerned in an order different, in a predetermined manner, from that in the sequence as it appears on the actual document. Thus a "-scrambled" version of the arbitrary sequence is keyed-in to the checking device in the said other feeding-in operation. The checking device, however, includes rearranging means for unscrambling the characters of the keyed-in (scrambled) sequence in a predetermined manner such that, it the characters have been correctly read and keyed-in, the rearranging means formulate a sequence appearing on the actual document. Comparison means in the checking device operate automatically to provide an indication of whether the sequence keyed-in in the said one feeding-in operation is identical with that formulated by the rearranging means; the checking device may then operate in dependence upon this indication to ensure that the arbitrary item of information entered thus is passed on to further data processing apparatus if, but only if, the sequences compared are identical.

The fact that the operator is caused in one feeding-in operation to read the characters in an order different from that in which he reads them in the other feeding-in operation can reduce substantially any likelihood that a keying-in error made in one feeding-in operation will be repeated with the same effect in the other independent feeding-in operation.

In a very simple application of the invention, the operator could simply be instructed to read the arbitrary sequence in the normal manner for the purposes of the one feeding-in operation, and to read the sequence of characters backwards for the purposes of the other feeding-in operation. The rearranging (unscrambling) means would then simply need to reverse the order of the characters keyed-in during the said other feeding-in operation.

According to the invention there is provided a data input checking device, comprising selectively operable input means for feeding selected data characters into the device, rearranging means connected with the input means for formulating, from a plurality of data characters fed into the device as a first sequence, a second sequence in which the order of the characters is different from that in the first sequence, and comparison means connected with the input means and the rearranging means for comparing a plurality of data characters, fed into the device independently of the first sequence as a third sequence, with the said second sequence and for providing an indication if the third sequence differs from the second sequence. It will be appreciated that the terms "first," "-second," and "third," in relation to the sequences specified are used basically just as labels for distinguishing the individual sequences from one another, and are not necessarily indicative of the order in which the three sequences occur or are employed when the device is in use. Furthermore, as is usual in this art, for the sake of brevity the description "data characters" is sometimes used to denote coded representations, for example in an electronic store, of the characters concerned; such terminology is generally perfectly clear in its context.

When used as suggested in the last but one preceding paragraph, the rearranging means of the data input checking device would perform the function of the aforesaid rearranging (unscrambling) means. Alternatively, however, the rearranging means could be used to scramble a normally keyed-in sequence, the said second and third sequences compared in the comparison means being then both scrambled versions of the actual sequence appearing on the document concerned.

Preferably the comparison means, when the device is in operation, is arranged and connected to allow a recorded representation of the second sequence of characters (assuming this to be a nonscrambled version of the actual sequence on the document) to be fed to further data processing apparatus if, but only if, the compared sequences are the same.

It is generally to be preferred that the operator is provided with a device through which he can view the item of data concerned and which will itself effect, for example optically, the desired rearrangement of the characters of the arbitrary sequence concerned.

Thus, there is preferably provided, in association with a checking device embodying the invention, a data-viewing device comprising a scrambling system for displaying to an operator respective visible of the characters of a primary sequence of visible data characters, the images being displayed by the system, when it is in use, as a secondary sequence wherein the order of the characters is different from that in the said primary sequence.

In one form of data-checking apparatus embodying such an association of a checking device and a viewing device, the rearrangement (scrambling) is effected optically by the viewing device and is the exact complement of the rearrangement (unscrambling) effected by the rearranging means in the checking device. Accordingly, for a given primary sequence, if the said first sequence is identical with the secondary sequence, the said second sequence will be identical with the said primary sequence.

The scrambling optical system may be made up of lenses, prisms, and/or mirrors, but preferably employs a system of optical channels constituted respectively by coherent fiber-optics bundles, one for each character of the maximum "word length" to be handled by the apparatus. A coherent fiber-optics bundle consists of a very large number of strands of transparent material, such as glass, arranged alongside one another to form a composite rodlike bundle having two opposite endfaces. The endfaces are made up of the respective ends of the individual strands, and coherence is achieved by positioning the strand ends at one endface of the bundle in precisely the same mutual relationship as the corresponding strand ends at the other endface. If an object is placed before one of the two endfaces, a high-definition image of that object can be seen displayed at the other endface. Such a fiber-optics bundle, being made up of glass strands of approximately 10 microns diameter each, can be very flexible.

Figure 2:
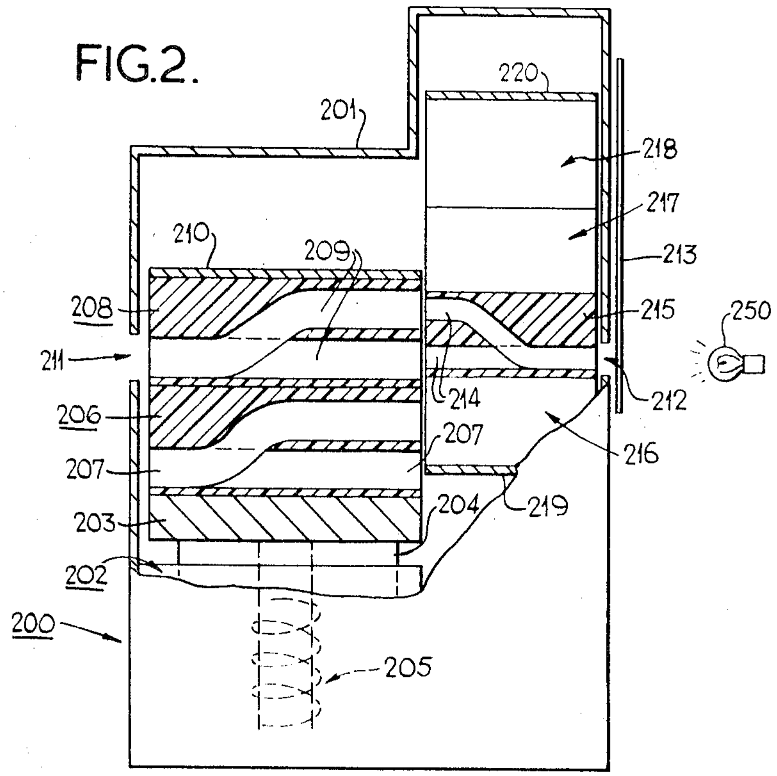
Figures 3A, 3B, 3C:
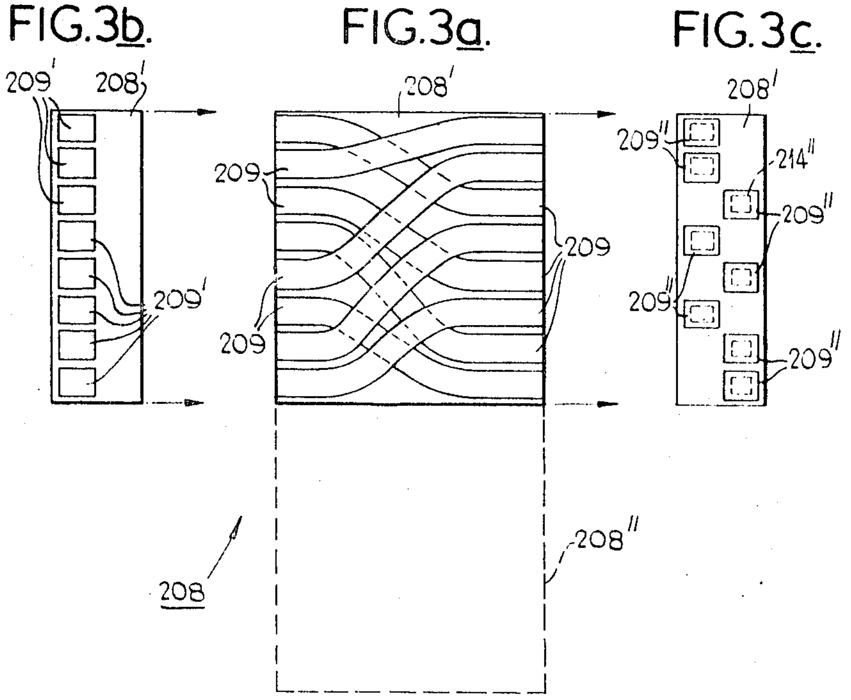
Figure 4B:
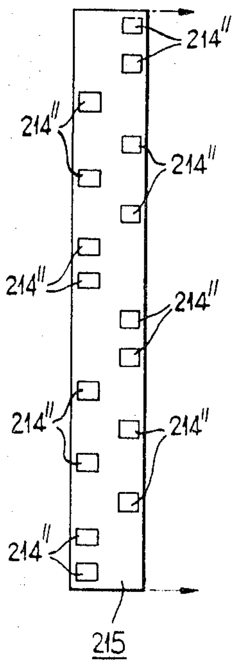
Figure 4A:
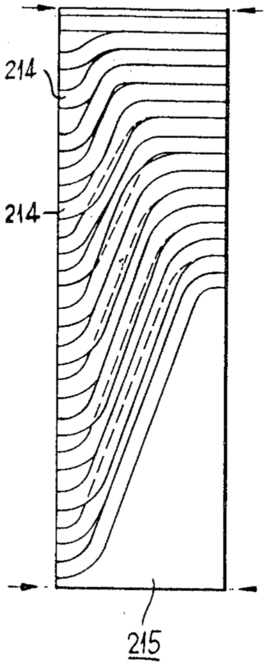
Figure 4C:
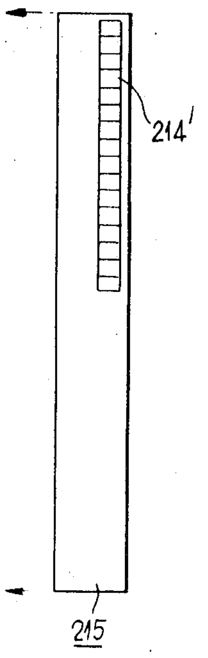
Figure 5:
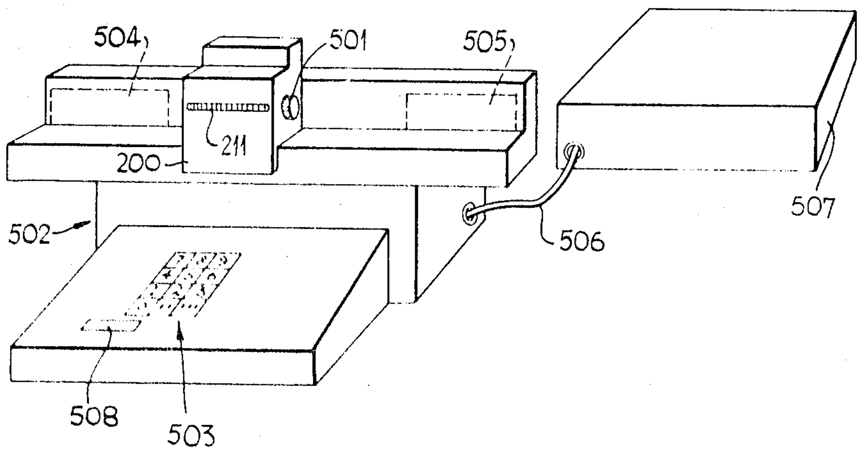
Figure 6:
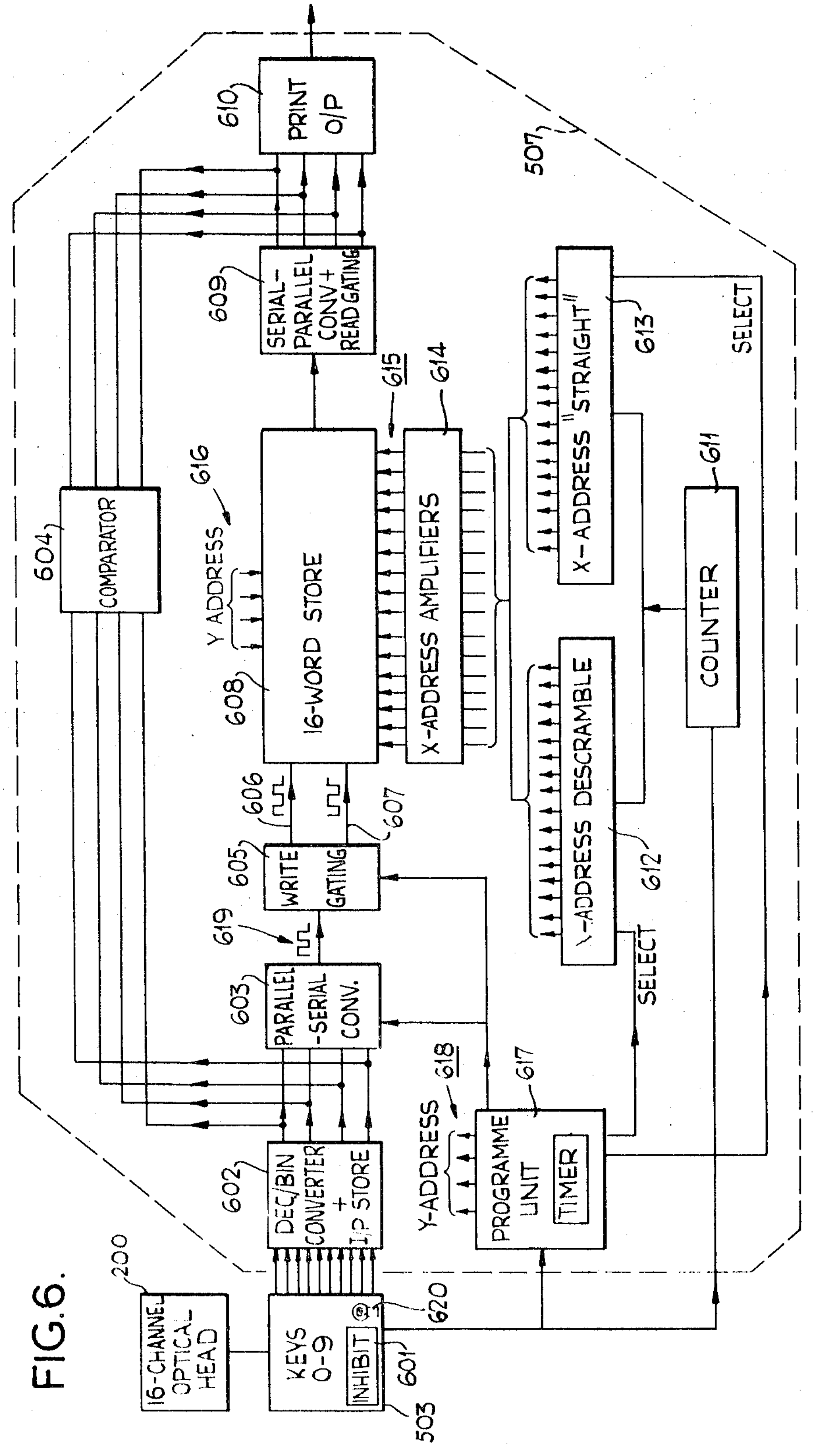

Reference will now be made, by way of example, to the accompanying drawings, in which:

FIG. 1 illustrates schematically an application of the invention to a bookkeeping method in a sterling area bank, FIG. 2 shows a diagrammatic side view, partially vertically sectioned, of a data-viewing device for use in a modified application of the invention, FIG. 3*a* shows a diagrammatic plan view of one component of the viewing device of FIG. 2, FIGS. 3*b* and 3*c* show respective diagrammatic views from opposite sides of the component of FIG. 3*a*, FIG. 4*a* illustrates diagrammatically, in plan view, the construction of another component of the viewing device of FIG. 2, FIGS. 4*b* and 4*c* show respective diagrammatic views from opposite sides of the component of FIG. 4*a*, FIG. 5 shows in diagrammatic perspective view a combination of apparatus, including the viewing device of FIG. 2, for putting the modified application of the invention into effect, and FIG. 6 is a block diagram showing electronic units comprised in a data input checking device forming part of the apparatus of FIG. 5.

The Fig. 1 application of the invention is concerned basically with the feeding-in, to a data processing system, of arbitrary amounts entered on checks by the customers of the bank. To facilitate the use of the method, the checks issued by the bank have the amount spaces subdivided into nine individual digit spaces as indicated at 100. It will be appreciated that this is based on the assumption that the word length to be handled by the bank's data-processing system amounts to 9 digits. The individual digit spaces are printed to be substantially 4.6 millimeters wide and about 8 millimeters high, so that hand-written digits can be inscribed with ease and typist (using a typewriter with a normal pitch of 2.3 millimeters can insert numbers using the typewriter space bar once after each digit. The drawing shows at 100 the correct entry on the check of the arbitrarily selected sum £3,692—10*s*.—5*d*. It will be appreciated that this entry may be regarded as equivalent to the nine-digit primary sequence: 036921005.

For dealing with the check, and in particular for feeding the amount shown thereon into the bank's data-processing system, an operator is provided with a basically conventional bookkeeping machine (not shown) having the conventional roller for holding a sheet on which information is to be entered legibly, and provided (by way of modification) with an auxiliary roller, synchronized with the conventional roller, for holding the check from which the information is to be taken. The auxiliary roller is mounted parallel with the normal roller and can be swung about the axis of that roller between a "-nonoperational" position, to the rear of the normal roller, and an "opertional" position forward of the normal roller. A tape-punch unit (not shown) is mounted beside the machine in conventional manner. In addition, a separate electronic unit having a 10-key keyboard (not shown), and comprising a check-digit calculator/verifier with other logical circuitry and stores (electronic memories) as explained hereinafter, is connected electrically with the bookkeeping machine and tape-punch unit.

In front of the operational position of the auxiliary roller, the bookkeeping machine is fitted (by way of further modification) with a data-viewing device comprising two data-viewing units, each of which has nine coherent fiber-optics bundles. Each of these fiber-optics bundles has an operator remote end-face positioned for registering with an individual subdivision of the amount space on a check carried by the auxiliary roller when in its operational position. The opposite end-faces of the fiber-optics bundles are spaced further apart than the said subdivisions on the check, and are provided with lenses so as to form magnified images in respective windows on a display panel.

One of these data-viewing units has its individual fiber-optics bundles indicated schematically at 101 and arranged to provide on a display panel 102 a scrambled version of the amount entered on the check (when the entry 100 is in register with the operator-remote ends of the bundles 101). The other viewing unit has its fiber-optics bundles indicated at 103 and arranged for providing a "straight" display (nonscrambled), of the actual amount entered on the check, in a display panel 104 which is physically positioned immediately above the display panel 102 (although shown schematically well below it in FIG. 1, for convenience of illustration).

It will be appreciated that the actual entry (at 100) on the check is illustrated twice in FIG. 1, for the sake of explanation, although it actually appears only once on the check itself.

The data-viewing device, when in use to form a display on either of the panels 102 and 104, completely obscures the operator's view of the amount space on the actual check mounted on the auxiliary roller. The viewing device is movable on the machine between three positions; a high position for providing a scrambled display on the panel 102, a low position for providing a "straight" display on the panel 104, and an extra-low position for enabling the operator to read information directly from the cheque—for example alphabetical information and other data which is to be printed by the machine but need not be checked by means of the present embodiment of the invention.

When the check carried by the auxiliary roller is placed in the appropriate operational position, the data-viewing device is initially in its high position. The operator reads the scrambled sequence of numbers displayed on the panel 102 and uses the aforementioned 10-key keyboard to key this sequence into an electronic store (or memory) 108, this being indicated in FIG. 1 as the first keying-in operation. Where the image displayed shows that a digit space has been left blank on the check, the operator depresses a zero key, as for the case where a "0" is displayed. Thus the operator keys-in, as a first sequence entered in the electronic circuitry, the secondary sequence 190003562 presented to him by the viewing device.

On completion of the first keying-in operation, the operator depresses a "calculate" key (not shown), or alternatively a "-store full" signal may be generated automatically, in well-known manner, to start the required calculating operation (described hereinafter), whereupon the data! is moved automatically to its low position so that an apparently different sequence of numbers (i.e., the "straight," or primary, sequence) appears at the display panel 104. In a second keying-in operation the operator then keys-in the primary sequence presented to him "straight" by the viewing device. As a result of this second keying-in operation the primary sequence 036921005 is entered in an electronic store 109. A the end of this second keying-in operation a "store full" signal can be used to initiate automatically a verification operation (described hereinafter). In a modified form (nor shown) of this apparatus, it is made unnecessary for the operator to key-in any spaces at the beginning of the "straight" -viewed sequence, but a "verify" key has to be depressed by him at the end of the second keying-in operation to initiate the verification operation.

The above-mentioned calculating operation involves firstly the transfer of the digits from the store 108 to another electronic store 110 by means of rearranging wiring 105, which rearranges the integers in a manner complementary to the scrambling effect of the fiber-optics bundles 101. Thus the wiring 105 effectively unscrambles the integers and enters in the store 110, as a second sequence, a "straight" representation of the actual entry on the check (assuming that the first keying-in operation has been carried out correctly), i.e., the aforesaid primary sequence. The primary sequence then present in the store 110 is fed to the aforementioned electronic unit, comprising a check-digit calculator/verifier of well-known type, indicated generally in FIG. 1 by 106. The unit 106 calculates a check-digit appropriate to the sequence stored in the store 110, and stores this check-digit in an electronic store 111.

The above-mentioned verifying operation involves the transfer of the third sequence to be formulated in the electronic circuitry, i.e., the primary sequence from the store 109, into the check-digit calculator/verifier 106, where the sequence from the store 109 is verified in well-known manner against the check-digit previously formulated in the store 111 as a result of the aforesaid calculating operation. If, but only if, the check-digit is found to be appropriate to the sequence fed from the store 109, the bookkeeping machining and tape-punch unit are actuated automatically to print out machine primary sequence on a bookkeeping page, carried by the normal roller of the machine, and to produce a punched-tape recording of that sequence for feeding to further data-processing apparatus (not shown). If a keying-in error has been made in either of the two keying-in operations, the check-digit from the store 111 will be most unlikely to correspond properly with the sequence present in the store 109. In such an event, some indication of the lack of correspondence is provided, for example by means of an "error" lamp (not shown), whereupon the numbers present in the stores are erased and the two keying-in operations must be repeated.

Instead of, or in addition to, the verification by means of the unit 106, electronic circuitry constituting a zero comparator 112, of well-known type, may be employed between the stores 110 and 109 to compare in detail, digit by digit, the respective sequences stored in those stores. Where the zero comparator 112 is used in addition to the check-digit calculator/verifier, a control line 107 may be arranged to deliver a "verify" command to the verifier section of the unit 106 if, but only if, the zero comparator indicates that the two stored sequences are identical digit for digit. The zero comparator 112 may comprise a subtraction unit of known type for subtracting the respective digits of the sequence present in the store 109 from the corresponding digits of the sequence present in the store 110; the production of a complete set of nine zero results, in the subtraction unit, is then required before the zero comparator will supply the aforesaid "verify" command signal via the line 107.

The sequence of numbers printed and/or recorded automatically as a result of a "correct" verification in the unit 106 may include the check-digit itself, in addition to the sequence taken from the store 109. Such addition of the check-digit to the verified sequence serves to secure that sequence during processing in the subsequent data-processing apparatus.

In the aforesaid-calculating operation, the transfer of the digits from the store 108 to the store 110 empties the store 108. If the zero comparator 112 is not to be used, the sequence stored in the store 110 can be erased as soon as the corresponding check-digit has been formulated in the store 111. In that case, the stores 109 and 110 can be one and the same store.

With regard to the use of a zero comparator, there is a very small chance that a single check-digit may be appropriate to two different numerical sequences. The use of the zero comparator serves to avoid this possible source of error.

Thus the apparatus of FIG. 1 serves to reduce very substantially the possibility that an erroneous punched-tape recording of the amount actually entered on the check will be fed to subsequent data-processing apparatus as a result of a keying-in error on the part of the single operator. The spreading of the integers by means of the fiber optics, and also the magnification of the integers by means of lenses in the viewing devices, serves to reduce the possibility of reading errors on the part of the operator. The danger of the introduction of operator-dependent errors is also reduced by insisting on the operator keying-in the full word length, including nonsignificant blank spaces where present, in each keying-in operation. The magnification of the digits, between the actual entry on the check and the display on the display panels 102 and 104, may be by a factor between say 1.5 and 2.

Clearly the fiber-optics "straight" viewing unit 103/104 could be omitted and the amount read directly from the check for the purposes of the second keying-in operation. However, the use of the fiber-optics "straight" viewing device 103/104 is to be preferred, since it assists in the avoidance of reading errors, as mentioned above and in continuity of operation.

The viewing device of FIG. 2, comprises an optical head 200, having a metal casing 201, within a base portion of which is mounted an electromechanical height-adjusting device generally indicated at 202. This device 202 comprises basically a support plate 203 mounted for vertical movement on an upper end of a slide member 204 which normally rests in the position illustrated in FIG. 2. However, the device 202 also includes a solenoid arrangement 205 of well-known type, having a stationary portion fixed in position with respect to the casing 201 and a vertically movable portion in mechanical connection with the underside of the support plate 203. When the solenoid device 205 is energized by the supply of an appropriate electrical signal thereto, through conventional external terminals (not shown) projecting from the casing 201, the plate 203 on the slide member 204 is raised to an upper position limited by appropriate stop means (not shown) in an obvious manner. No further mechanical details of the solenoid-controlled height-adjusting device 202 are considered necessary here, in view of the trivial mechanical nature thereof and the fact that such solenoid-operated arrangements are common in a vast number of light engineering applications.

Mounted on the support plate 20 and seen from one end in FIG. 2 is a first viewing unit 206 comprising a rectangular resin block having cast therein a fiber-optical system comprising 16 coherent fiber-optics bundles 207 (arranged one behind the other in the view of FIG. 2, so that only two are visible in FIG. 2), each of which extends completely across the unit 206 from one side to the other thereof (i.e., from left to right in FIG. 2). As seen from above (not shown), the fiber-optics bundles 207 extend straight across the unit 206 without crossing one another. Thus the 16 optical channels constituted respectively by the bundles 207 together constitute a "-straight" viewing system for transmitting information optically through the unit 206, between the said two opposite sides, without changing the order of the individual items of information handled respectively by the 16 channels.

On top of the block 206 is mounted a second viewing unit 208, comprising a resin block having set therein a 16 -channel position-changing, or "scrambling," optical system made up of 16 coherent fiber-optics bundles 209, only one of which are seen in the view of FIG. 2.

The units 206 and 208 are clamped together between the support plate 203 and an upper metal plate 210 by screw-threaded pillars (not shown which extend between correspondingly projecting portions of the plates 210 and 203 at opposite ends of the units 206 and 208 (i.e., above and below the plane of FIG. 2). These clamping arrangements are not illustrated or described further, since they are of a trivial mechanical nature and would give no difficulty to the competent worker in the appropriate field of light engineering Preferably, respective thin rubber sheets (not shown) are interposed between the support plate 203 and the unit 206, and between the unit 208 and the plate 210.

The casing 201 is formed with an elongate display slot 211, through for an operator can view the left-hand end-faces (with respect to FIG. 2) of the optical position-changing channels 209, when the support plate 203 is in its lower position, and through which the operator can view the left-hand end-faces of the "straight" optical channels 207 when the plate 203 is raised, by energization of the solenoid arrangement 205, to its upper position. The longitudinal axis of the display slot 211 extends perpendicularly to the plane of FIG. 2.

Extending parallel to the display slot 211, but formed in an opposite wall of the casing 201, is a source access slot 212 adapted to have placed in register therewith an entry on a source document such as a check illustrated diagrammatically, in end-on view, at 213.

Shown positioned operatively between the source access slot 212 and the operator-remote ends of the position-changing channels 209 is a pitch-conversion unit 215 comprising 16 coherent fiber-optics channels 214 set in a rectangular resin block. Those end-faces of the channels 214 that are remote from the slot 212 are positioned to register respectively with the operator-remote end-faces of the channels 209 of the optical position-changing unit.

Energization of the solenoid 205, thus raising the "straight" viewing unit 206 to the upper position in which the left-hand end-faces of he channels 207 are visible through the display slot 211, brings the operator-remote end-faces of the channels 207 into register respectively with those ends of the channels 214 that are remote from the source access slot 212.

The pitch-conversion unit 215 is actually one of a stack of four such units, the other three units of the stack being indicated in FIG. 2 simply by blank rectangles 216, 217, and 218, respectively. The four units of this stack differ basically only in the widths of their optical channels.

The stack of pitch-conversion units is gripped between metal plates 219 and 220 and is mounted for slidable vertical movement within the casing 201. Externally accessible means (not shown in FIG. 2) are provided for moving the stack selectively to any one of four different heights within the casing 201, so as to bring any selected one of the four pitch-conversion units into the operative position shown in FIG. 2 as occupied by the unit 215. The selectively operable means for moving the stack of pitch-conversion units may comprise a simple lever arrangement, or a rack and pinion arrangement operated by a rotatable external knob (such as that shown for example at 501 in FIG. 5). The slidable mounting arrangements for the stack of pitch-converter units, and the height-adjusting means therefor, are not illustrated or described further, however, in view of their trivial nature, there being clearly a wide variety of ways in which a competent worker in the field of light engineering would be able to satisfy, without using any great ingenuity, the described mounting and height-adjusting requirements. Further illustration of such details would accordingly only serve to complicate the drawings, without adding significantly to the value of the disclosure.

The pitch-conversion units 215 to 218 could of course be mounted for different forms of movement, for example so as to be brought into the operative disposition by simple rotation of an assembly (not shown) comprising the units.

The optical position-changing unit 208 may be made up of two adjacent modules of like construction. Details of one of these modules only are shown in FIG. 3*a*, while the position of the other module is indicated simply by broken lines. The detailed module is referenced 208′ while the other module is referenced 208″. Thus FIG. 3*a* shows in plan view the lie of he eight position-changing fiber-optics bundles, or channels, 209 within the resin block of the module 208′. The scrambling configuration adopted in the optical position-changing unit 208 is such that no two digits that are adjacent to one another in the actual entry (primary sequence) on the source document appear adjacent to one another (in the secondary sequence) when viewed by means of the unit 208.

Fig. 3*b* shows the left-hand side (with respect to FIG. 3*a*) of the module 208′, display end-faces 209′ of the channels 209 being aligned for viewing through the display slot 211 (FIG. 2). Fig. 3*c* shows the other side of the module 208′, which is remote from the operator, where respective operator-remote end-faces 209″ of the channels 209 are visible. Also shown in FIG. 3*c*, in dotted lines, are the positions of corresponding source-remote ends 214″ of the respective registering pitch-conversion channels 214 (FIG. 2).

The "straight" viewing unit 26 may similarly be made up of two adjacent eight-channel modules, the opposite side views of each of which will be like those of the module 208′ as illustrated in FIGS. 3*b* and 3*c*. However, in a plan view (not shown) of each of these straight-viewing modules, the optical channels 207 would simply appear to pass straight across the module between its opposite sides.

FIG. 4*a* is illustrative in plan view of the lie of the optical channels 214 in the pitch-conversion unit 215.

FIG. 4*b* shows the side of the unit 215 that is adjacent to the position-changing unit 208 in FIG. 2. Respective source-remote end-faces 214″ of the optical channels 214 are arranged to register respectively with central regions of the operator-remote end-faces 209″ of the position-changing unit 208 as illustrated in FIG. 3*c*.

The general positioning (although not the size) of the source-remote end-faces of the pitch-conversion channels is indeed the same as that shown in FIG. 4*b* in the case of each of the pitch-conversion units 216 to 218 also.

FIG. 4*c* shows the operator-remote side of the pitch-conversion unit 215, i.e., the side closest to pitch source access slot 212 of FIG. 2. Arranged in a straight line at this side of the block are respective operative-remote end-faces 214′ of the channels 214 that are to register respectively with the characters in the entry spaces on the source document 213 (FIG. 2), and so receive light from those spaces by way of the slot 212.

Now, the end-faces 209′ (FIG. 3*b*) measure 7 mm. in height (measured in the horizontal direction of FIG. 3*b*) and 5 mm. in width, the spacing between adjacent end-faces being 0.08 mm. The dimensions of the end-faces 209″ of FIG. 3*c* are the same as those of the end-faces 209′, as are the dimensions of the opposite end-faces of the optical channels 207 of the unit 206. Thus the optical channels of the units 206 and 208 may be said to have a pitch (distance between the centers of adjacent channel end-faces) of 5.08 mm. The purpose of the pitch-conversion units 215 to 218 is to effect optical transmission between whichever of the units 206 and 208 is in the operative position, adjacent to the display slot 211, and the primary sequence of characters forming the entry on the source document 213 that is to be viewed by means of the optical head. The entry may, for example, have been typed onto the source document using the normal pitch of the typewriter. Common typewriter pitch values are 2.11 mm., 2.30 mm., and 2.54 mm. Accordingly, the end-faces 214′ of FIG. 4*c*, which have a height (measured in the horizontal direction of FIG. 4*c*) of substantially 5 mm., have a width of substantially 2.30 mm. and are arranged side-by-side with substantially no spacing therebetween. Those channel end-faces of the pitch-conversion units 216 and 217 that correspond respectively to the end-faces 214′ of the unit 215 have width s of 2.54 mm. and 2.11 mm. respectively, to deal with entries typed by means of typewriters having those pitch values.

However, the pitch-conversion unit 218 is intended to cope with hand-written entries on the source document. Where such hand-written entries are permitted on the source document, the appropriate portion of the source document is divided into a row of 16 rectangular entry spaces arranged and dimensioned like the end-faces 209' of the unit 208 as illustrated in FIG. 3b. It is of course required that the characters of the entry on the source document should each be assigned a single one of these spaces defined on the source document, in such a manner that when the entry concerned consists of less than 16 characters, the unfilled entry spaces on the source document are at the left-hand end of the row of defined spaces. Accordingly, the uppermost pitch-conversion unit 218 is to serve simply as a straight-through transmission unit constructed in a manner complementary to that of the unit 206 of FIG. 2. Thus a plan view (not shown) of the optical channels of the unit 218 would show them extending simply straight across that unit, and the unit 218 may (unlike the units 215 to 217) be made up to two adjacent eight-channel modules as is the unit 206. The source side, i.e., the operator-remote side, of each of such two modules making up the unit 218 would accordingly look similar to the operator's side of the module 208' as shown in FIG. 3b. The other side of the unit 218 would show the channel end-faces arranged like the end-faces 214'' of FIG. 4b (but of appropriately larger size).

Accordingly, for viewing a hand-written entry on the source document 213, the stack of pitch-conversion units is placed in its lowest position, so that the unit 218 is in position to transmit respective images of the hand-written characters, received by way of the slot 212, to the operator-remote ends of the optical channels of whichever of the two units 206 and 208 is in the operative position adjacent to the slot 211.

FIG. 5 shows apparatus including a commercially available encoder 502 having a keyboard 503, modified for use with the optical head 200 of FIG. 2. Conventionally the encoder, which is shown only very diagrammatically, is supplied at a position 504 with a pile of source documents (not shown), bearing entries which are to be recorded in magnetic characters for feeding into further data-processing apparatus. Mechanical arrangements within the encoder take the documents one by one from the position 504 and feed them to a central-viewing position (hidden by the optical head 200 in FIG. 5) above the keyboard 503. An operator views the appropriate entry on the document at the viewing position and uses the keyboard 503 to key-in the sequence of characters making up the entry. The encoder accordingly provides a printout of the keyed-in sequence, in magnetic characters, whereafter the document dealt with is fed automatically onto a removal position 505, whence a pile of documents which have been fully dealt with can be removed eventually from the encoder.

As modified for present purposed, the encoder 502 has fitted to it the optical head 200 of FIG. 2, the slot 212 of FIG. 2 being arranged in register with the appropriate viewing position above the keyboard 503, so that the operator now views each entry concerned by means of the optical head. In addition the keyboard 503 and the optical head are kinked, by electrical connections included in a cable 506, to a logical circuitry unit 507, the electrical circuitry of which will be described hereinafter in more detail with reference to FIG. 6.

With reference to FIG. 6, the keyboard 503 is provided in known manner with an inhibit device 61 for preventing further operation in certain circumstances and is connected to provide an input to a decimal-binary converter (including a four-bit input store) 602. The converter 602 has a four-line output connected to a parallel-serial converter 603 and connected also to a first input of a comparator 604. The 607 are 603 has an output connected to a "write" gating unit 605, from which two output lines 606 and 607 are connected to a store 608 capable of storing 16 "words" of four "bits" each. An output from the store 608 is connected to a serial-parallel converter 609 which includes "read" gating. The converter 609 has a four-line output connected to a "print output" control unit 610 and connected also to a second input of the comparator 604.

The keyboard is also connected with an electronic counter 611. An output from the counter 611 is connected to each of two gating units, being an X-address descrambling unit 612 and an X-address "straight" unit 613. The units 612 and 613 have each 16 output lines connected through an X-address power-amplifier unit 614 16 X-address input lines 615 corresponding respectively to the 16 word locations in the store 608. The store 608 also has four Y-address input lines indicated generally at 616 and corresponding respectively to the locations (or "weights") of the four bits of each word that can be accepted by the store 608.

It will be appreciated that only one of the X-address gating units 612 and 613 is operative at any given stage, the selection of which of these two units is to be operative being effected by an electronic program unit 617 which includes an electronic timer. The program unit includes Y-address output lines 618 for connection respectively to the input lines 616 of the store 608, and is connected between the solenoid arrangement 205 (FIG. 2) of the optical head 200, the keyboard 503, and the rest of the circuitry of the unit 507, so as to control the operation thereof in the manner described hereinafter. It will be appreciated that the program unit and other units of the electronic circuitry are constructed in accordance with well-known principles of logic circuitry, and the design of such circuitry would require nothing more than routine skill and application in the light of the following functional description thereof. In particular, for the sake of simplicity FIG. 6 does not show all the connections between the program unit and the other components of the circuitry, FIG. 6 being in any case only a block diagram which is of course subject to the usual limitations on such diagrams as regards precisions and completeness of representation of the various circuit components and connections involved. However, the use of such diagrams in this art, in order to avoid unnecessarily lengthy and complex description, is well known and long accepted, and it will therefore be appreciated that FIG. 6 should be quite sufficient, together with the following description, to enable a competent man in this art to put the invention into effect substantially in the manner illustrated without exercising more than his routine skill and knowledge of the art.

With particular reference to FIGS. 5 and 6, the apparatus there illustrated is employed as follows. Having placed a pile of source documents at the location 504 an operator activates the encoder 502 so that one of the documents is moved to the viewing position. This positioning of the document is such as to ensure that a sequence of numbers which constitutes an entry to be recorded in magnetic characters, and is located at a predetermined position on the document, is arranged in register with the slot 212 (FIG. 2) of the optical head 200. The said entry may be illuminated from behind, if desired, by means of light source illustrated diagrammatically at 250 in FIG. 2.

The solenoid arrangement 205 being deenergized, the optical position-changing unit 208 is in the operative position with regard to the operatots's display slot 211, as illustrated in FIG. 2. If the entry on the source document is hand-written, the operator brings the pitch-conversion unit 218 into the operative position at the source access slot 212 of FIG. 2, using the knob 501, so as to transmit images of the hand-written characters to the respective optical channels 209 of the position-changing unit. Alternatively, if the entry has been typed, using the normal pitch of the typewriter concerned, the operator arranges the appropriate one of the pitch converters 215 to 217 in the operative position with respect to the slot 212.

Through the slot 211 of the optical head, the operator sees displayed a secondary sequence constituting a scrambled version of the entry (the primary sequence) on the source document. Using the keyboard 503 the operator keys-in the characters in the sequence in which they appear displayed from left to right through the slot 211, pressing a space key 508 for every blank entry space (nonsignificant space) forming part of the sequence displayed.

As each significant number of the secondary sequence is keyed-in, the converter 602 sets up a binary representation of that number in its input store making the four bits of the word thus stored available respectively at the four output lines of the converter 602. The parallel-serial converter 603 reads the signals on the output lines of the converter 602 in sequence, and feeds to the gating unit 605 a signal which varies with time, throughout a four-part basic time-cycle set by the timer of the program unit 617, in a manner representing the binary coded number in the input store of the converter 602. The wave form of such a signal is illustrated diagrammatically at 619, by way of example only. The input store of the converter unit 602 holds each number for the complete basic time-cycle, regardless of how long the key concerned on the keyboard 503 is depressed. The circuitry is such as to ensure, however, that no more than one entry is made (in the store 608) for each key depression.

The gating unit 605 uses the signal (619) from the converter 603 to feed the number concerned into the store 608. The "-writing" signal waveform available at the line 607 is complementary to that made available at the line 606, so that if the line 606 is employed to "write" each "1" into the store 608, the line 607 is used to "write" each "zero" into the store 608. The program unit 617 operates through the lines 618 and 616 to ensure that the "write" signal supplied in each part of the aforesaid four-part basic time-cycle, by the line 606 or 607 as the case may be, is delivered to the appropriate "bit" location in the store 608 (i.e., is "weighted" appropriately).

During this first keying-in operation, the program unit selects for operation the X-address descrambling unit 612, and renders the unit 613 nonoperative. As the numbers (and blank spaces) seen by the operator, through the slot 211, at the end-faces 209′ (FIG. 3*b*) are keyed successively into the checking device as a first sequence, the counter 611 registers each key depression and controls the descrambling unit 612 accordingly in such manner that electronic representations of the numbers fed to the store 608 by the gating unit 605 are formulated in the store, in turn, not in simple succession, from one end to the other of the store, but rather at individual positions located throughout the store in such a manner as to effect a rearrangement which is complementary to the scrambling effected by the optical unit 208. As a result of the first keying-in operation, provided that it has been effected without error, the numbers of the entry on the source document are accordingly represented in the store 608 in a second sequence which is the same as that (the primary sequence) in which they appear on the source document. The numbers thus stored can be read out from the store 608 in the second sequence by the converter 609. The converter 609 can provide a representation, of each number read out in turn, in a parallel from constituted by appropriate signals on the four output lines of the converter 609.

At the end of the first keying-in sequence (i.e., on the conclusion of 16 key depressions) a store-full signal is generated automatically in well-known manner. The generation of this signal causes the counter 611 to be set back to a restart condition dependent upon the number of times that the space key 508 was depressed in the first keying-in operation, the "-straight" X-address unit 613 to be rendered operative and the unit 612 inoperative, and the solenoid arrangement 205 of the optical head (FIG. 2) to be energized so as to raise the "-straight" viewing unit 206 into the operative position with regard to the operator's slot 211.

The operator therefor sees displayed in the slot 211 a "-straight" (nonscrambled) version (primary sequence) of the entry on the source document, and uses the keyboard 503 to key-in just the significant digits of this entry, ignoring any nonsignificant blank spaces preceding the significant digits of the entry, reading from left to right as usual. In effect the nonsignificant blank spaces of he entry have already been registered by the counter 611, by virtue of the manner in which it has been set back to the aforesaid restart condition.

During this second keying-in operation, the converter 603 and the gating unit 605 are nonoperative. However, as each character is keyed-in in turn and accordingly presented in binary form (from the converter 602) to the first input of the comparator 604, the converter 609 is controlled by the counter 611, through the "straight" X-address unit 613 acting as selector means to "read" the corresponding number ("-word" ) of the said second sequence contained in the store 608. The converter 609 supplies a binary-coded parallel-form representation of each number, read thus from the store 608, to the second input of the comparator 604.

In each instance, if the two numbers fed to the comparator are the same, the operator is able to proceed with the keying-in of the next number of the sequence visible to him through the slot 211. If the numbers fed to the two inputs of the comparator 604 are not equal in one instance, however, the inhibit device 601 is energized in well-known manner so that the operator is prevented from proceeding further with the second keying-in operation.

Energization of the inhibit device 601 may be accompanied by the energization of a warning device which produces an audible warning signal, or causes lighting of a warning lamp such as that indicated diagrammatically, by way of example, at 620. In this case the operator must press a "clear" key (not shown) which operated in well-known manner to clear the store 608 and reset the circuitry, and in particular the counter 611, for a repeat performance of the first and second keying-in operations.

On successful completion of the first and second keying-in operations, the program unit causes the resulting checked sequence of electronic representations of the entry on the document to be read out from the store 608 in the correct order, in conventional manner, by means of the "read" gating of the converter 609, and fed in conventional manner through the print output control unit 610 (incorporating appropriate decoding means to the encoder 502, which accordingly produces a record of the entry, printed in computer-readable typescript. Alternatively or in addition the unit 610 could feed a tape punch unit (not shown), for producing a punched-tape record of the entry, or a unit (not shown) for producing some other form of machine-readable recording of the entry, for example on magnetic tape.

On completion of the printout the encoder 502 operates automatically, in conventional manner to transport the source document to the position 505 for removal, and brings the next document from the pile at the position 504 into the viewing position, Energization of the solenoid arrangement 205 (FIG. 2) of the optical head is discontinued automatically at the end of the second keying-in operation, and the counter 611 is reset automatically to its zero condition, in well-known manner. Thus the contents of the store 608 can only be read and printed out by the apparatus when those contents have been checked completely as described.

If the source document is a check and the entry checked and recorded as described above is the arbitrary amount entered on the check the apparatus may also be used to provide a verified recording (from the encoder 502) of a predetermined entry on the check for example the account number of the person to whom the original blank check was issued. For this purpose, of course, the check must be moved to a second disposition so as to present the account number at the slot 212 of FIG. 2, but otherwise the operation is as above. If the account number has been secured by the provision of a check-digit at the end thereof, the use of the illustrated apparatus as described simply serves to provide an additional check on the entry of the account number is not a subsequent data-processing system, thus reducing substantially the already extremely slight chance that a keying-in error on the part of the operator would be such that it would not be detected when the account number (including its check digit) was fed subsequently through a check-digit verifier.

It should be noted that, although the scrambling systems of the viewing devices as described with reference to the drawings are optical systems, other forms of scrambling system are possible. For example, opposite end-faces of each channel of a scrambling system may be made up of a large number of closely adjacent minute, light-sensitive and lightemissive electronic components respectively, corresponding components at the two end-faces being joined in a coherent manner by electrical connections analogous to the individual fibers of a coherent fiber-optics bundle. Such an electronic scrambling system would probably be prohibitively expensive at the present time, but may become a more practical proposition at a later date.

Clearly, a modified for (not shown) of the FIG. 6 circuitry could be designed to receive the "straight" (primary) sequence, first, using the X-address unit 613 to locate the digits in the store 608 without rearrangement. The optically scrambled ("secondary") sequence is then fed-in secondly (as the "third" sequence of the invention), using the X-address unit 612 (acting, as it were, in reverse–as a scrambling selector unit) to select digits from the store 608 inturn, for comparison with the secondary sequence being fed-in last, in a nonregular manner which is equivalent to scrambling the digits in the store 608 in the same manner as in effected in the optical scrambling unit, so as to formulate a sequence (the "second" sequence of the invention) which should be identical with the secondary sequence being fed-in.

Although, as explained hereinbefore, there may be some advantages in keying-in even the nonsignificant blank spaces of both of the displayed sequences, in order to save operating time it may be preferred to avoid the keying-in of such nonsignificant blank spaces. It will be appreciated that such a requirement can be satisfied by requiring that the significant digits only of the "straight" -viewed display be keyed-in first (and stored without scrambling) in accordance with the last preceding paragraph, whereupon the subsequent operation of the addressing unit 612 (acting as the said scrambling selector unit) during subsequent during subsequent keying-in of the significant digits only of the scrambled display provided by the optical scrambling unit is automatically set, in dependence upon the significant word-length of the entry (primary sequence) as keyed-in first, to formulate the required "-second" sequence by effecting the irregular selection in the particular order in that is appropriate to that word length.

I claim:

1. A data input checking apparatus comprising
a. selectively operable input means for feeding independently selected pluralities of data characters into the apparatus as first and third sequences respectively;
b. rearranging means connected with the input means for formulating, from the plurality of data characters fed into the apparatus as said first sequence, as second sequence in which the order of the characters is different from that in said first sequence; and
c. comparison means connected with the input means and the rearranging means for comparing the plurality of data characters fed into the apparatus as said third sequence with said second sequence and for providing an indication if said third sequence differs from said second sequence.

2. An apparatus as claimed in claim 1, wherein the comparison means comprise a check-digit calculator/verifier connected with the input means and the rearranging means for calculating a check-digit for one of said second and third sequences and ascertaining whether that check-digit is appropriate also for the other of said second and third sequences.

3. An apparatus as claimed in claim 1, wherein:
a. the input means include a counter connected to register in turn the feeding-in of each data character of said first sequence; and
b. the rearranging means include:
i. an electronic store connected with said input means, for receiving coded electrical signals representative respectively of the data characters of said first sequence, and having a plurality of locations for storing coded representations of said data character is in dependence upon the said electrical signals received; and
ii. addressing means connected between said counter and said electronic store for directing each such electrical signal to an individual one of said locations, in dependence upon how many of the characters of said first sequence have been fed into the device previously, in an irregular manner serving to formulate said second sequence in said electronic store by rearranging the characters of said first sequence.

4. An apparatus as claimed in claim 3, wherein:
a. said counter is connected to register the feeding-in in turn of each data character of said third sequence also; and
b. the comparison means comprise:
i. readout means connected with said electronic store for reading out its contents;
ii. selector means, connected with said counter and said electronic store and controlled by said counter registering said feeding-in of said third sequence, for causing the readout means to read out the contents of said store in a regular manner producing coded electrical signals which represent in turn the respective characters of said second sequence; and
iii. a comparator connected between the input means and the readout means for comparing the characters of said third sequence, as they are fed into the apparatus in turn, with the corresponding respective characters of said second sequence as they are read out in turn.

5. A apparatus as claimed in claim 4, further comprising:
a. programming means connected to cooperate with the selector means for causing said second sequence to be read as an output from the electronic store after completion of the comparison of said second and third sequences has established identity thereof; and
b. output recording means connected with the readout means for producing a machine-readable recording of said output from said electronic store.

6. An apparatus as claimed in claim 1, wherein the input means include:
i. feed-in converter means for producing coded electrical signals representative respectively of said data characters fed into the apparatus;
ii. an electronic store connected with the feed-in converter means, for receiving said coded electrical signals representative of the data characters of said first sequence, and having a plurality of locations for storing coded representations of the data characters in dependence upon the electrical signals received;
iii. a counter connected with the feed-in converter means for registering the feed-in in turn of each data character of said first and third sequences, and
iv. addressing means connected between the counter and the electronic store and controlled by the counter during the feeding-in of said first sequence for directing each such electrical signal to an individual one of the said locations, in dependence upon how many of the characters of the first sequence have been fed into the apparatus previously, in a regular manner serving to write said first sequence into said electronic store without rearrangement.

7. An apparatus as claimed in claim 6, wherein:
a. said comparison means comprise readout means connected with said electronic store for reading out its contents;
b. the rearranging means comprise scrambling selector means connected with said counter and said electronic store and controlled by said counter, during the feeding-in of said third sequence, for causing the readout means to formulate said second sequence by reading out the contents of said electronic store in an irregular manner producing coded electrical signals which represent in turn the respective characters of said second sequence; and
c. said comparison means further comprise a comparator connected between the input means and the readout means for comprising the characters of said third sequence, as they are fed into the apparatus in turn, with the corresponding respective characters of said second sequence as they are formulated in turn.

8. An apparatus as claimed in claim 7, further comprising:
a. programming means connected to cooperate with said addressing means for causing said first sequence to be readout as an output from said electronic store after completion of the comparison of said second and third sequences has established identity thereof; and
b. output recording means connecting with said readout means for producing a machine-readable recording of said output from said electronic store.

9. Data-checking apparatus for verifying the transfer of a primary sequence of data characters from a source document into a data-processing system comprising in combination: a data input checking means including selectively operable input means for feeding independently selected pluralities of data characters thereinto as first and third sequences respectively, rearranging means connected with the input means for formulating from the plurality of data characters fed thereinto as said first sequence a second sequence in which the order of the characters is different from that in said first sequence, comparison means connected with the input means and the rearranging means for comparing the plurality of data characters fed into the data-checking means as said third sequence with said second sequence and for providing an indication if said third sequence differs from said second sequence and a data-viewing means for use with the data input means including a scrambling system bounded by first and second sides and comprising a plurality of mutually crossing image-transmission channels having respective first ends arranged at said first side for receiving light from respective positions occupied by the characters of said primary sequence on said source document, and having respective opposite ends arranged at said second side for displaying to an operator respective visible images of the characters of said primary sequence rearranged in a manner bearing a predetermined relationship to the change of order effected by the said rearranging means as a secondary sequence to be fed into the said data-checking means as one of said first and third sequences; the said predetermined relationship ensuring that if said secondary sequence is correctly fed in by the operator, and said primary sequence is correctly fed in by the operator as the other of said first and third sequences, the said second sequence formulated by said rearranging means is identical with the said third sequence.

10. Apparatus as claimed in claim 9, wherein the change of order effected by said rearranging means is the complement of that effected by the scrambling system; whereby, for a given primary sequence, if said first sequence is identical with said secondary sequence, said second sequence is identical with said given primary sequence.

11. Apparatus as claimed in claim 9, wherein the change of order effected by said rearranging means is the same as that effected by said scrambling system; whereby, for a given primary sequence, if said first sequence is identical with said given primary sequence, said second sequence is identical with said secondary sequence.

12. Apparatus as claimed in claim 9, wherein said input means include an inhibit device connected with said comparison means and controlled thereby to prevent the feeding-in of further characters of said third sequence on indication of a difference between said third and second sequences.

13. Apparatus as claimed in claim 9, wherein the scrambling system is an optical system comprising a plurality of coherent fiber-optics bundles having respective operator remote end-faces arranged at said first side of the system for receiving such images from said respective positions and having respective opposite end-faces aligned for displaying the respective images to said operator at said second side of the system.

14. Apparatus as claimed in claim 13, wherein:
a. the said respective positions are arranged relatively to one another in a predetermined manner which differs from the manner in which said operator-remote end-faces are arranged relatively to one another; and
b. said viewing device further includes a pitch conversion unit mounted adjacent to said first side for transmitting such images respectively to said operator-remote end-faces from said respective positions.

15. Apparatus as claimed in claim 14, wherein the pitch conversion unit is an optical pitch conversion unit comprising a plurality of coherent fiber-optics bundles having respective operator-remote end-faces, arranged relatively to one another in said predetermined manner for registering with said respective positions, and having respective opposite end-faces arranged for registering with the operator-remote end-faced of the scrambling optical system.

16. Apparatus as claimed in claim 15, including a plurality of such pitch conversion units, mounted interchangeably adjacent to the scrambling system, for operation respectively with different predetermined spacings of said respective positions.

17. Apparatus as claimed in claim 9, further comprising a "-straight" image transmission system, mounted interchangeably with the scrambling system, for displaying to the operator-respective images of the characters of said primary sequence, in the same order as that in said primary sequence, for feeding into said data input checking device as the said other of said first and third sequences.

18. Apparatus as claimed in claim 17, wherein the "-straight" image transmission system is a "straight" optical system bounded by first and second sides and comprising a plurality of coherent fiber-optics bundles having respective operator-remote end-faces arranged at said first side of the "-straight" optical system, similarly to said operator-remote end-faces of said scrambling system, for receiving images from said respective positions and having respective opposite end-faces aligned, similarly to those of said scrambling system, for displaying said respective images to the operator at said second side of the "straight" optical system.

19. Apparatus as claimed in claim 18, wherein:
a. said "straight" optical system is movable from a nonoperative position thereof to an operative position, to provide the "straight" display of said primary sequence for feeding into said checking device as the said other of said first and third sequences; and
b. said scrambling system is movable from a nonoperative position thereof to said operative position, to display said secondary sequence to the operator for feeding into said checking device as the said one of said first and third sequences.

20. Apparatus as claimed in claim 19, wherein:
a. the said respective positions are arranged relatively to one another in a predetermined manner which differs from the manner in which said operator-remote end-faces are arranged relatively to one another;
b. said viewing device further includes a pitch conversion unit mounted adjacent to said first side for transmitting such images respectively to said operator-remote end-faces from said respective positions; and
c. the pitch conversion unit is mounted for cooperation with whichever of the scrambling and "straight" optical systems is in said operative position.

PO-1050
(5/69)

UNITED STATES PATENT OFFICE
CERTIFICATE OF CORRECTION

Patent No. 3,612,843 Dated October 12, 1971

Inventor(s) Bernard Aptroot-Soloway

It is certified that error appears in the above-identified patent and that said Letters Patent are hereby corrected as shown below:

Column 6, line 55, change "20" to --203--.

Column 8, line 19, change "26" to --206--.

Column 9, line 58, change "61" to --601--.

Column 13, line 70 (Claim 3, line 10), cancel "is".

Signed and sealed this 3rd day of October 1972.

(SEAL)
Attest:

EDWARD M.FLETCHER,JR.
Attesting Officer

ROBERT GOTTSCHALK
Commissioner of Patents